July 20, 1965  F. TOSS  3,195,285
METHOD OF FORMING TRANSVERSE HEAT SEALS ON TUBULAR
THERMOPLASTIC MATERIAL, AND APPARATUS THEREFOR
Filed July 13, 1962  2 Sheets-Sheet 1

INVENTOR:
FRANCO TOSS
BY
Frederick Breitenfeld
ATTORNEY

July 20, 1965 F. TOSS 3,195,285
METHOD OF FORMING TRANSVERSE HEAT SEALS ON TUBULAR
THERMOPLASTIC MATERIAL, AND APPARATUS THEREFOR
Filed July 13, 1962 2 Sheets-Sheet 2
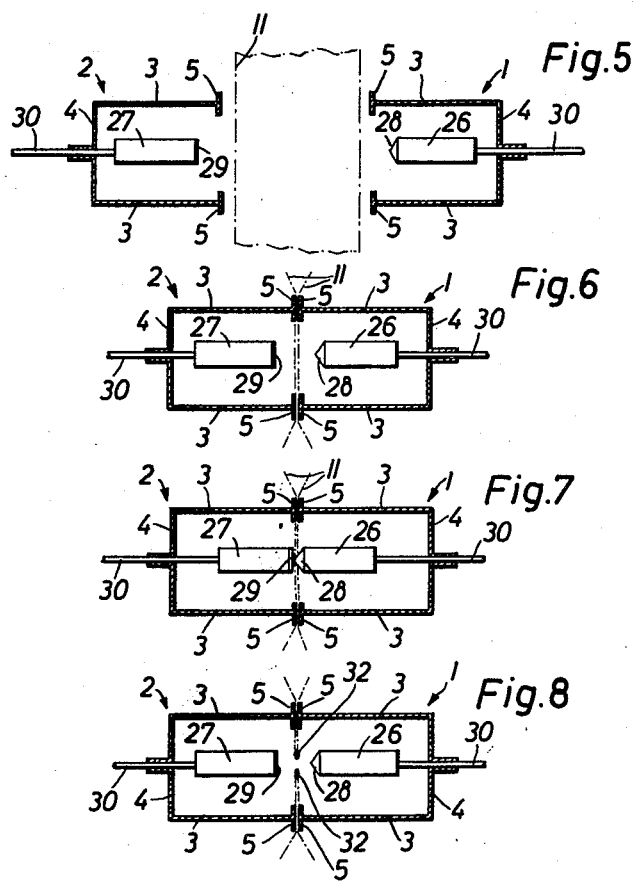
INVENTOR:
FRANCO TOSS
BY
*Frederick Breitenfeld*
ATTORNEY 3,195,285
METHOD OF FORMING TRANSVERSE HEAT
SEALS ON TUBULAR THERMOPLASTIC MA-
TERIAL, AND APPARATUS THEREFOR
Franco Toss, Viersen, Germany, assignor to Hamac-
Hansella Aktiengesellschaft, Viersen, Germany, a cor-
poration of Germany
Filed July 13, 1962, Ser. No. 209,505
Claims priority, application Germany, Oct. 11, 1961,
H 43,849, H 43,850
4 Claims. (Cl. 53—39)

This invention relates to a process for producing transverse welds or heat seals in tubular thermoplastic material, and an apparatus for carrying out the process, and has particular reference to the application of this process in packaging machines in which the tubular material is converted to a succession of filled merchandise packages. In machines of this type each transverse sealing operation provides the upper seal for a filled package and the lower seal for the succeeding package, and means are provided for severing the tube between these two transverse seals.

In conventional procedures of the type mentioned above, the packaging material in tubular condition passes between a pair of sealing jaws, one of which is heated, and when the jaws come together the tube is pressed flat between them in two-ply condition. The plastic material is thereby melted along a narrow band corresponding to the width of the heated jaw, and as a result, the walls or plies of the tube become fused whereby upon cooling of the plastic material the tube is sealed along the previously melted narrow band. Since the tube normally tends to retain its circular cross-section, it is necessary that the walls of the tube, in the region to be sealed, be held together long enough for the fused material to cool to a point at which the newly formed seal is self-sustaining. Therefore, the customary procedure is to employ so-called "impulse" heating of the sealing jaws i.e., one or both jaws are heated intermittently, the heating being discontinued immediately after the fusion of the tube walls has taken place, and the jaws remaining together until the jaws and tube walls have cooled sufficiently. It will be seen, therefore, that the cooling of the plastic material takes place while pressure exerted by the sealing jaws is maintained.

As a result of the fact that the cooling of the plastic material takes place under pressure, the thickness of the resulting cooled material is less than the original two-ply thickness of the flattened tube. Moreover, in the regions directly adjacent to the heat seals the walls of the tube are thinner than the original single ply wall thickness. It is precisely in these transition regions, between the package wall and the heat sealed region, that the greatest strain is placed upon the bag or package during its use because this is where the walls are grasped and subjected to tension. Consequently, bag walls frequently rupture in these regions and the bags thus become useless.

Another disadvantage of the conventional process of producing transverse heat seals on thermoplastic tubular material resides in the fact that the jaws have to remain closed long enough for the material to cool, and since the sealing jaws are relatively slow to cool, the cooling rate of the plastic material is reduced and hence the speed of operation of the packaging machine as a whole is limited.

Moreover, the electrical equipment required to effect the "impulse" heating of the sealing jaws is complicated and susceptible to malfunction, since the heating of the sealing jaws must be in a dependent timed relationship to the operation of the packaging machine as a whole.

One of the objects of the present invention is to provide a method and apparatus for producing transverse heat seals of the character described, in which the foregoing disadvantages are avoided. The invention is predicated, in part, upon a realization of the fact that thermoplastic sheet material is always inherently stressed in one direction, this stress or tension being incorporated into the material at the time of its original manufacture. When such a sheet is heated to a high enough temperature, the sheet shrinks in the direction of the stress referred to, the direction of the stress being in the direction in which the sheet was pulled out of or extruded from the extruding apparatus during its manufacture. The presence of this internal stress can be explained by the fact that the pull that was exerted on the hot sheet during its manufacture creates a tension or stress in the sheet that becomes locked into the sheet when the latter is cooled. On reheating at a later time the sheet loses its ability to resist this tension, as a result of which the shrinkage referred to occurs. Obviously, during shrinkage the material thickens, as compared with the original thickness of the sheet. An indication that this theory is sound lies in the fact that shrinkage takes place predominantly in the direction in which the thermoplastic sheet was extruded during its original manufacture.

A recognition of this peculiarity of thermoplastic sheet material is the foundation of the present invention. Transverse seals on tubular materials are always transverse to the longitudinal direction of the tube, that is to say, transverse to the shrinkage direction. Therefore, if all externally applied longitudinal tensions in the region in which the heat seal is to be made, are relieved just prior to making the heat seal, and if the plastic material is retained between the heating jaws just long enough for the fusion to take place, and no longer, then the fused region has an opportunity to shink during the period of cooling. The longitudinal externally applied tensions referred to are those which are created in packaging machines by the means for advancing the tube to the filling station and beyond, and by the filled region at the bottom of the tube.

However, in order to allow shrinkage of the heat sealed regions in the manner described, the sealing jaws must be opened before the plastic material has fully cooled and has become self sustaining. It is necessary therefore to provide means for insuring that the seal will not break the instant that the sealing jaws are separated.

The shrinkage achieved by this invention in the region of the heat seal, and the regions directly adjacent to it (the adjacent regions becoming plastic by conduction of heat to them) results in a thickening of the material precisely in the regions which, as hereinbefore mentioned, are under greatest stress in the ultimate product, viz., the filled packages. The thickness is in fact greater than the original two-ply wall thickness in the region of the heat seal, and in the regions directly adjacent to the seal the individual tube walls become thicker than they were originally.

In accordance with this invention, the internal stress of the plastic sheet hereinbefore described is employed to achieve the purposes of the invention by a procedure which calls for first pressing the walls of the tube together in the region to be heat sealed, then relieving this region of all externally applied longitudinal tension, and then controlling the operation of the sealing jaws in such a way that they release the heat-sealed region before it has become fully cooled and rigidified.

The preferred apparatus for carrying out this procedure includes a pair of identical but opposed U-shaped clamping jaws arranged on either side of the thermoplastic tube and mounted for movement toward and away from each other with their open ends facing each other, the long axis of each of these jaws lying perpendicular to the longitudinal axis of the plastic tube which is passed between them. The jaws are movable toward each other so that the ends of their corresponding arms may be brought into engagement, whereby a region of the tube, corresponding in length to the width of the base of each U-shaped jaw, is pressed flat and securely held in two-ply condition.

Additionally, the apparatus includes a pair of identical but opposed U-shaped heated sealing jaws mounted for movement in a direction parallel to the direction of movement of the clamping jaws and completely enclosed within the confines of the latter. The heated jaws, however, are movable independently of the clamping jaws. The arms of the U-shaped heated jaws are shorter than the corresponding arms of the clamping jaws, and the width of the base of the heating jaws corresponds to the spacing between the two heat seals that are to be produced as a result of each cycle of operation of the sealing jaws.

Furthermore, the apparatus includes a cutting mechanism also mounted for movement in a direction parallel to the direction of movement of the clamping jaws previously mentioned, and mounted between the arms of one of the sealing jaws. The cutting mechanism is so mounted that it cuts through the clamped thermoplastic material before the heating jaws come together against the material.

By means of this arrangement the tube is first pressed flat and held firmly by the clamping jaws in the region within which the two transverse seals are to be produced. Thereupon the cutting mechanism operates so that the resultant cut ends are freed of all externally applied longitudinal stress. Finally, the heated jaws come together and produce the two heat seals, and the heated jaws then separate before the fused regions have cooled, whereby the warmed plastic material is free to undergo the shrinkage previously described. The continued clamping action of the clamping jaws prevents the fused seals, in their heated state, from springing open before they are sufficiently cooled to be self sustaining.

The bags or packages that are produced by this apparatus do not have the transverse heat seal directly at their ends, but (depending upon the width of the base of the heating jaws) the heat seals are more or less spaced from the extreme end edges. Should it be desired to extend the heat seal entirely to the end edge—which may be desirable in certain kinds of bags and packages—it is possible to produce the heat seals and sever the tube by a mechanism that performs both operations simultaneously. An example of such a heat sealing and cutting member will be described in detail hereinafter.

In the drawings:

FIGS. 5-8 are corresponding schematic views of another embodiment of the invention in which the severance and sealing of the tubular material are performed at the same time by a single mechanism.

Figure 1:
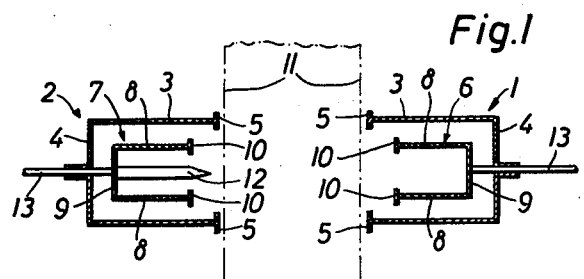
FIG. 1 is a schematic view of one embodiment of the apparatus, with the various jaws shown completely open.

Referring first to FIGS. 1-4, each of a pair of opposed U-shaped clamping jaws 1 and 2 is composed of a base 4 and arms 3. On the forward edges of the arms 3 yieldable cushions 5 are provided to prevent injury to the packaging material when it is engaged by the clamping jaws. The tubular material 11 moves intermittently between the jaws, in a direction of movement which is at right angles to the longitudinal axis of each of the U-shaped clamps. As viewed in FIG. 1, the tube 11 moves downwardly, and the jaws move toward and away from each other in a horizontal direction. The jaws are movable to bring the cushions 5 into engagement and thus clamp the tubular material 11 into the flat condition shown in FIG. 2. As is obvious, the length of the clamped region of the tube corresponds to the width of the base 4 of each of the clamping jaws.

Within the confines of the clamping jaws 1 and 2 there are a pair of similarly mounted and similarly movable U-shaped sealing jaws 6 and 7. These jaws also move in a horizontal direction, but their movement is entirely independent of the movement of the clamping jaws 1 and 2. Each of the sealing jaws 6 and 7 is composed of a base 9 and arms 8. The base 9 and arms 8 are shorter than the base 4 and arms 3 respectively of the clamping jaws. On the forward ends of the arms 8 the sealing jaws are provided with heating elements 10. The heating elements can be formed on one of the jaws only, or on both of them.

The jaws 6 and 7 are mounted on shafts or rods 13 which pass slidably through the bases 4 of the clamping jaws 1 and 2. By means of these rods the heating jaws 6 and 7 can be moved toward and away from each other independently of the movements of the clamping jaws.

Between the arms 8 of the heating jaw 7 a knife 12 is mounted parallel to the arms 8. It projects forwardly beyond the forward ends of the arms 8, so that as the sealing jaws move toward each other, the knife encounters and severs the plastic material before the heating jaws contact the material.

FIGS. 1-4 show an illustrative apparatus according to the present invention as applied to a packaging machine in which the tubular material is to be converted to a succession of bags filled with merchandise. Machines of this character are well known and do not have to be described in detail. Suffice it to point out that the tubular material moves downwardly in such machines. In the region above the elements illustrated in the present drawings appropriate apparatus is provided for filling the tube with a predetermined charge at regular intervals. In that region the tube is wound around a forming device whereby an originally flat sheet is formed into the desired tubular condition, and a means is provided for fusing the opposite longitudinal edges of the sheet which are brought together in overlapping relation to form a longitudinal seam. In the region below the apparatus shown in the drawings there is a filled bag which is open at the top and still attached to the continuous length of tubular material.

In accordance with the present invention two transverse heat seals are formed which simultaneously close the filled bag at its top and provide a sealed bottom wall for the next succeeding bag. Since the tube is severed between these two heat seals, the lower filled bag falls away after the clamping jaws 1 and 2 separate and thus release it.

Figure 2:
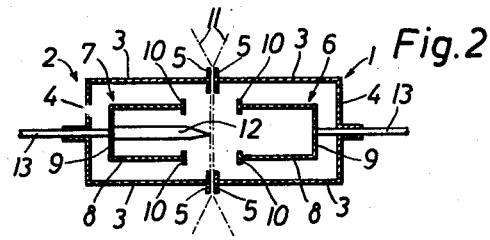
FIG. 2 shows the apparatus of FIG. 1 in a condition in which the clamping jaws have come together and the cutting mechanism is just beginning to operate.
Figure 3:
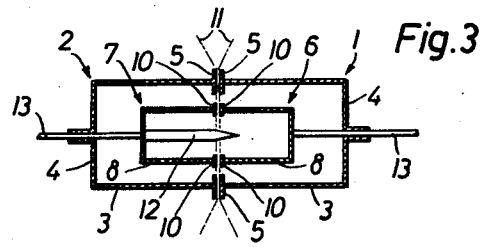
FIG. 3 shows the parts in the next stage of operation in which the heated sealing jaws have come together.
Figure 4:
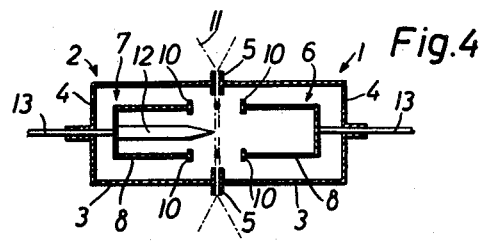
FIG. 4 shows the next stage in which the heated jaws have separated but the clamping jaws remain operative.

The operation of the apparatus is as follows: In FIG. 1 the tube 11 is hanging between the open clamping and sealing jaws, and in this condition it is substantially round in cross-section. Thereupon, as shown in FIG. 2 the clamping jaws come together so that the yieldable cushions 5 clamp the tube between them, flattening the opposite walls into superposed relationship between the upper and lower arms 3 of the jaws 1 and 2. The tube is normally under an external longitudinal stress, brought about by the mechanism that intermittently advances it and/or by the weight of the filled bag hanging at the bottom, and this tension remains in the clamped region of the tube. As the operation of the apparatus continues, the sealing jaws move toward each other, and as this movement progresses the cutting knife 12 encounters the plastic material and cuts it centrally between the upper and lower arms 3 of the clamping jaws. As a result of the severance of the tube, the external longitudinal stresses are immediately relieved. Although the tube has been severed, the filled bag is held in place by the lower arms 3 of the clamping jaws.

Almost immediately, further movement of the sealing jaws toward each other brings them into engagement with the plastic between them whereupon the heated elements 10 cause the two plies of each of the newly-formed free ends of the tube to be fused along a pair of spaced transverse lines. The fusion is accomplished in a relatively short period of time, and as soon as the heat seals have been formed the heated jaws separate. The clamping jaws, however, remain closed. Thereupon, the previously described shrinkage takes place in the fused regions and in the regions immediately adjacent to them, as a result of which the fused regions themselves become thicker than the original two-ply thickness of the material, and additionally the regions directly adjacent to the heat seals become thicker. The clamping jaws 1 and 2 remain closed until the fused regions have cooled and the heat seals have become self sustaining, then they open. The bag at the bottom, which is now fully closed, is thus released and falls to a point of collection. The remainder of the tube is then advanced through a desired extent, and the apparatus is restored to the condition of FIG. 1. The procedure then is repeated.

It is an advantage of the procedure and apparatus that the heating elements 10 need not be energized intermittently in timed relation to the operation of the machine as a whole as in the conventional impulse heating methods. Nevertheless they can, if desired, be heated intermittently if this is thought to be beneficial. It is advantageous to have the heating controlled by a thermostat to maintain a uniform desired temperature.

In place of the cutting knife 12, any suitable kind of severing apparatus adapted to cut the tube prior to the engagement of the sealing jaws may be employed.

If it is desired to leave the individually sealed bags in connected relationship, and not to effect an actual severance of the tube, other means can be provided in place of a severing instrument to relieve the longitudinal stresses in the clamped region of the tube. For example, the mechanism might involve some means for moving the upper and lower arms 3 toward each other after they have clamped the tube between them.

In FIGS. 5–8 the elements which are identical to elements in FIGS. 1–4 have been given the same reference numerals as the elements in FIGS. 1–4.

In addition to the outer clamping jaws 1 and 2, which are the same as those of FIGS. 1–4, the apparatus shown in FIGS. 5–8 comprises the opposed cutting and sealing jaws 26 and 27, movable toward and away from each other independently of the clamping jaws. The jaws 26 and 27 are of such dimensions that they lie entirely within the confines of the clamping jaws 1 and 2. The cutting and sealing element 28 at the front end of jaw 26 is an attenuated rib-like part made of electric resistance material whose cross-section (in the illustrated embodiment) is substantially triangular. Opposed to this is the anvil-like element 29 on the front end of element 27. It will be seen that when the elements 28 and 29 are brought into engagement the element 28 will cut through the plastic material, as shown in FIG. 7. If desired, the element 29 may also be heated.

The jaws 26 and 27 are mounted upon rods 30 which pass through openings in the bases 4 of the clamping jaws 1 and 2. By means of the rods 30 the jaws 26 and 27 are moved toward and away from each other by suitable mechanism (not shown).

The cycle of operation of the apparatus in FIGS. 5–8 is substantially the same as in FIGS. 1–4. The difference resides in the fact that when the elements 28 and 29 engage they sever the tube and simultaneously fuse together the regions directly adjacent to the line of severance. At the moment of severance, all external tensions on the plastic material are destroyed, whereupon when the jaws 26 and 27 separate (FIG. 8), the still-soft fused portions of the plastic material shrink as hereinbefore described. During this period the clamping jaws 1 and 2 remain closed. Heat sealed ends 32 are thus provided which are thicker than the original two-ply thickness of the material, or at least as thick as, and not thinner than, the original two-ply thickness. Also, in the regions directly adjacent to the fused regions 32 the individual walls become softened and shrink so that they become thickened and thus more resistant to the high stresses to which the finished bags are subjected in these regions.

The element 28 need not necessarily be triangular in cross-section but can be rectangular. In the latter case, the front face of the element 28 is provided along its longitudinal center-line with a raised ridge or head which cooperates with the anvil-like element 29 to sever the tube.

The heating of the element 28 can be continuous or intermittent, as desired, but is in any case independent of the timing of the operations of the packaging machine itself. Preferably it is regulated by means of a thermostat.

In terms of results, the primary difference between the embodiments of FIGS. 1–4 and 5–8 is that the former embodiment produces a bag wherein each of the seals is slightly spaced from the end of the bag, whereas the latter embodiment produces a bag wherein each seal is located at the very edge of the bag.

The movements of the clamping jaws, and the sealing jaws, and the severance mechanisms, whatever their nature may be, can be controlled automatically, such as by cam action or by other appropriate control apparatus, to bring about the desired movements in the proper sequence, but no mechanism for actually moving or controlling the timing has been shown, since such mechanism is known per se.

What is claimed is:

1. A method of forming transverse heat seals on a tube of heat sealable packaging material in order to produce a series of individual sealed packages, comprising the following steps:

clamping the tube only along two spaced areas and leaving it uncontacted in the region between them, thereby flattening the tube into a completely unconfined two-ply condition in said region, severing the flattened region to free the severed parts of all constraint, immediately thereafter, fusing together the two plies of each of said parts, permitting the fused areas to cool in said unrestrained condition whereby they are free to shrink and thicken as they cool, and unclamping the tube after said fused areas have cooled sufficiently to be self-sustaining.

2. In a packaging machine, apparatus for forming transverse heat seals on a tube of heat sealable packaging material in order to produce a series of individual sealed packages, said apparatus comprising two pairs of clamping jaws spaced apart along the length of the tube, the tube extending between each pair of said jaws with its longitudinal axis perpendicular to the longitudinal axes of said jaws, the jaws of each pair being movable into engagement with each other to clamp the tube and flatten into a two-ply condition the region of the tube between said jaw pairs, and means operable independently of the clamping jaws for severing the flattened region to free the severed parts of all constraint and for immediately fusing together and then releasing the two plies of each of said parts so that the fused areas may cool in unrestrained condition prior to an unclamping of the tube, said means comprising two pairs of heat-sealing jaws movable into and out of engagement with each other, a knife mounted for operation upon the tube in the region between said heat-sealing jaw pairs, and means for operating said knife to sever the flattened tube region prior to the coming together of said sealing jaws.

3. A packaging machine as defined in claim 2, in which means is provided for bringing said sealing jaws together only momentarily and then separating them at once to release the fused areas before they cool.

4. A packaging machine as defined in claim 2, in which said independently operable means comprises a pair of heat-sealing jaws movable into and out of engagement with each other, one of said jaws having an attenuated heated edge to effect a simultaneous severance and fusion of said flattened region.

References Cited by the Examiner
UNITED STATES PATENTS

| | | | |
|---|---|---|---|
| 2,618,814 | 11/52 | Paton et al. | 53—182 X |
| 2,961,031 | 11/60 | Fener. | |
| 3,001,348 | 9/61 | Rado | 53—182 |
| 3,008,278 | 11/61 | McCalley | 53—182 |
| 3,045,403 | 7/62 | Mitchell | 53—182 X |
| 3,055,154 | 9/62 | Markley et al. | 53—182 |
| 3,061,989 | 11/62 | Newell et al. | 53—182 |

FRANK E. BAILEY, *Primary Examiner.*

TRAVIS S. McGEHEE, *Examiner.*